United States Patent

Wallace

[15] 3,657,770

[45] Apr. 25, 1972

[54] METHOD AND APPARATUS FOR SLAUGHTERING ANIMALS

[72] Inventor: Charles H. Wallace, Sylvania, Ohio

[73] Assignee: International Telephone and Telegraph Corporation, New York, N.Y.

[22] Filed: June 18, 1970

[21] Appl. No.: 47,216

[52] U.S. Cl. ........................................ 17/45, 17/1, 17/24
[51] Int. Cl. ................................................ A22b 1/00
[58] Field of Search .................................. 17/45, 24, 1

[56] References Cited

UNITED STATES PATENTS 2,882,551  4/1959  Reich ........................................ 17/24
2,882,833  4/1959  Reich ..................................... 17/24 X

*Primary Examiner*—Lucie H. Laudenslager
*Attorney*—Philip M. Bolton, C. Cornell Remsen, Jr., Paul W. Hemminger and Walter J. Baum

[57] ABSTRACT

An animal is slaughtered in a head-down position and is subsequently inverted after bleeding to place the hindquarters down while the animal muscles are still flaccid. The carcass is maintained in the latter position until rigor mortis sets in, the carcass is thoroughly chilled, or both. By positioning the animal carcass with the hindquarters down and with the animal muscles flaccid, the meat drifts or settles downwardly toward the hindquarters. Consequently, the meat is distributed more toward the hindquarters of the animal carcass where the more expensive cuts are located. Higher monetary value of the carcass is thereby achieved. To increase the movement of the muscle or meat toward the hindquarters, the carcass can be subjected to vibrations or shock in addition to the force of gravity. Also, this movement of the meat can be increased by subjecting the carcass to centrifugal force with the animal rotated about an axis which is perpendicular to the longitudinal extent of the carcass and is located nearer to the forefeet than the hind feet.

8 Claims, 8 Drawing Figures

Patented April 25, 1972

INVENTOR.
CHARLES H. WALLACE
BY
Allen D. Gutcheon,
ATTORNEY

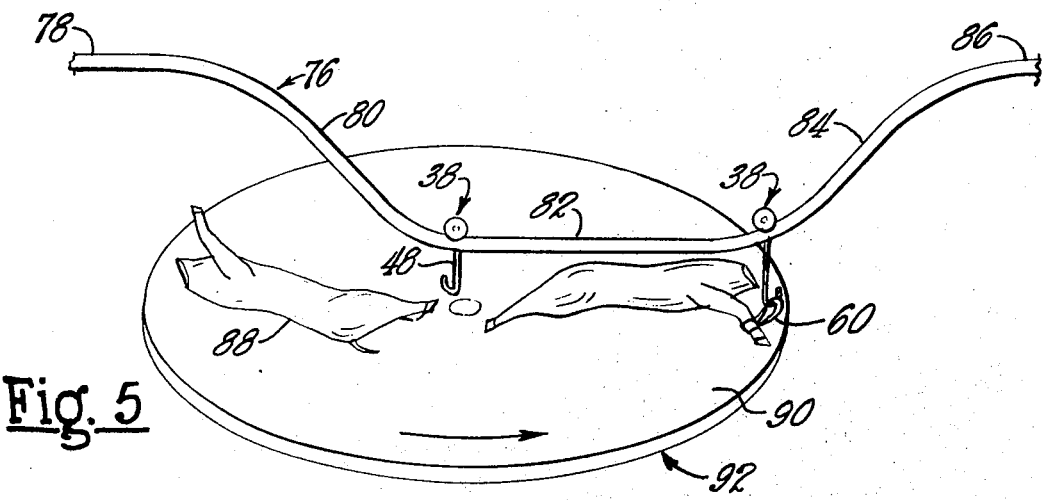
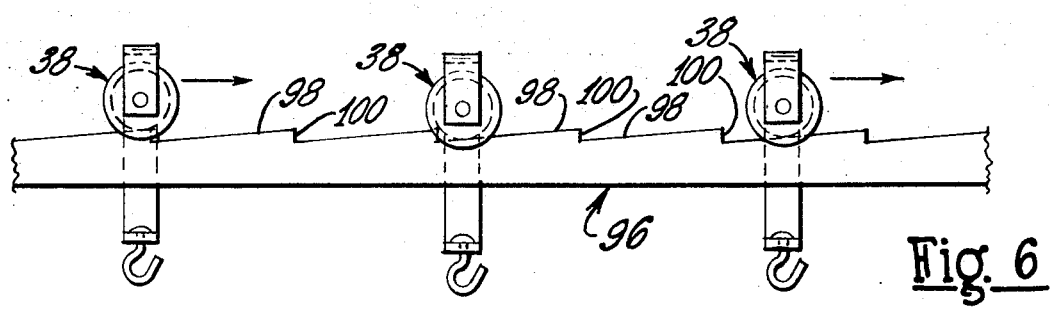
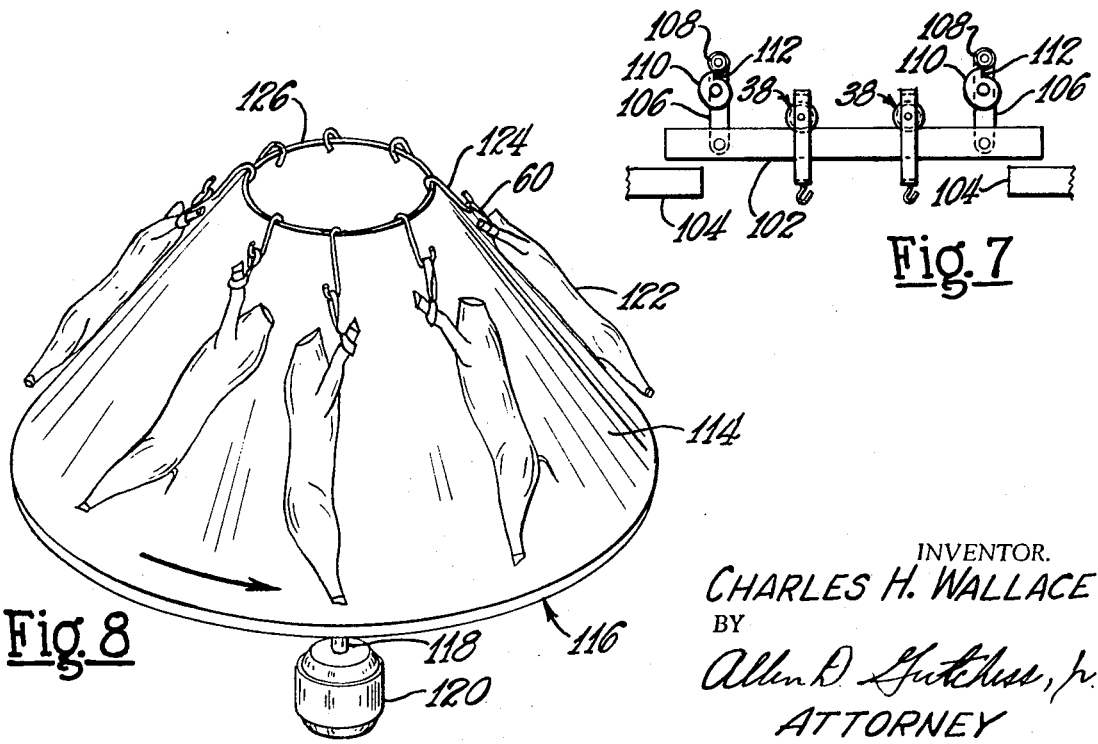

METHOD AND APPARATUS FOR SLAUGHTERING ANIMALS

The invention relates to a method and apparatus for slaughtering animals, particularly to achieve a more productive distribution of meat on the animal carcass.

In the slaughtering process, the animal is first stunned and then hung head down by a shackle around a rear leg. The animal is then struck and bled after which hair is removed from the carcass or it is skinned, whichever is appropriate to the particular animal. After de-heading, evisceration, inspection, and splitting into halves, the animal carcass is moved to a cooler where it is chilled. During these operations, the animal carcass is continually hanging with forequarters down although it may be temporarily positioned horizontally in some instances to facilitate removal of certain organs.

In accordance with the invention, after the animal is stuck and bled, and preferably after evisceration, but prior to chilling and prior to the time rigor mortis begins to set in, the animal carcass is turned end-for-end and hung with its hindquarters down. The meat, still being flaccid, then tends to drift or settle toward the hindquarters where the more valuable cuts of meat exist. Consequently, more meat is shifted toward the more expensive cuts and the monetary value of the carcass is thereby increased.

In order to increase the movement of the meat toward the hindquarters of the carcass, it can be subjected to force. This force can be in the form of short repetitive forces, as vibrations or shocks, which can be applied directly to the carcass or can be supplied by suitable mechanism through the rails from which the carcass is hung. The force can also be continuous in the form of centrifugal force. To achieve this, the animal carcass can be rotated about a vertical axis which is closer to the forequarters than to the hindquarters, and which is preferably in front of the carcass. The short multiple forces, particularly more severe ones in the form of shock, need be applied only for a relatively short period of time and need not be continued until the carcass is thoroughly chilled, rigor mortis sets in, or both. The continuous, centrifugal force, on the other hand, preferably is continued until the meat of the animal carcass is set, unless this force is sufficient to cause permanent physical movement or displacement of the meat.

It is, therefore, a principal object of the invention to provide an improved method and apparatus for slaughtering an animal in which the meat of the animal is distributed more toward the hindquarters than is true with the normal slaughtering methods and apparatus.

Another object of the invention is to provide a method and apparatus for slaughtering animals in which the monetary value of the slaughtered animals is increased.

Other objects and advantages of the invention will be apparent from the following detailed description of preferred embodiments thereof, reference being made to the accompanying drawings, in which:

FIG. 5 is a somewhat schematic side view taken from an upper angle of modified apparatus for conveying and inverting animal carcasses;

FIG. 6 is a fragmentary side view in elevation of conveying apparatus which includes means for applying repetitive forces to the animal carcass;

FIG. 7 is a schematic side view in elevation of modified apparatus for applying repetitive forces to animal carcasses; and FIG. 8 is a schematic side view, taken from an upper angle, of apparatus for applying continuous forces to animal carcasses.

Figure 1:
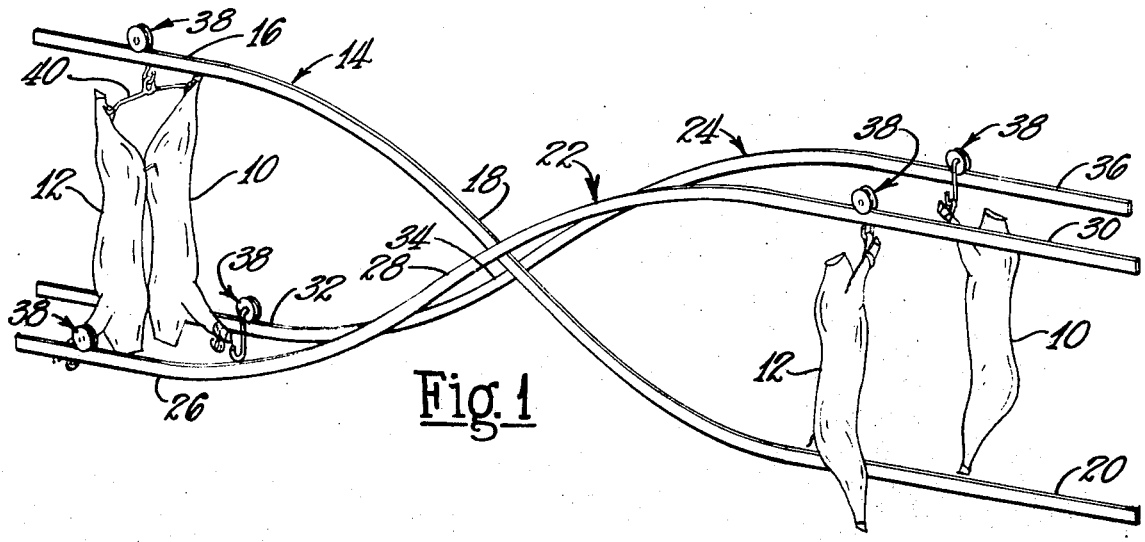
FIG. 1 is a somewhat schematic view in perspective of apparatus for carrying animal carcasses along a predetermined path and for turning them end-for-end.

The slaughtering process for animals is generally the same whether the animals be cattle, hogs, or sheep, for example. Specifically considering swine for illustrative purposes, the animal is usually first stunned and rendered substantially unconscious by means of an electric current or gas. The animal is then shackled by a hind leg and lifted to a bleeding rail, hanging head down. A suitable blood vessel, such as the jugular vein, is then stuck and the animal bled completely as it is moved along the bleeding rail. The carcass is then lowered into a scalding vat to facilitate the subsequent removal of hair and the carcass is then carried by a conveyor through a dehairing machine in which the hair is removed and, at this time, the carcass is also washed. Incisions are made between the hind legs and the gam cords to receive a gambrel. The gambrel is then inserted through the incision in the hind legs and the carcass is hung thereby from a dressing rail. Here the carcass is singed and shaved to remove remaining hair.

The carcass is then de-headed, although this can be done at an earlier time, and is eviscerated. The rectum is first loosened and ligated to retain the contents thereof and avoid contamination. The carcass is then opened by a longitudinal incision extending from the pelvic region to the neck. With the animal carcass hung by the hind legs, this position greatly aids in retaining contents of the intestines and stomach. At this point, the carcass and the viscera are inspected, along with the head, if not done earlier. The carcass can then be flushed and split longitudinally along the back bone.

At this point, in accordance with the invention, the carcass, preferably after splitting, is inverted and hung with the hindquarters down. To achieve this, looped cords, preferably of nylon, can be employed, these being wrapped around the forelegs and hung from hooks, which minimizes marring of the legs and devaluation of the meat. As an alternate, a tong device having a plurality of prongs can be employed to engage the jowls of the animal carcass and hold it with the hindquarters down in the same position as when held by the forelegs. The carcass with the hindquarters hanging downwardly is then transported to a cooler where the carcass is retained in this position at least until it is thoroughly chilled, rigor mortis sets in, or both.

By hanging the carcass with the hindquarters down when the meat is flaccid, the meat settles or slumps downwardly so that more of it tends to be distributed toward the hindquarters. Since the meat toward the hindquarters of the animal generally commands a higher price than that toward the forequarters, the monetary value of the carcass is thereby increased. For example, with hogs, picnics and boston butts are located at the forequarters of the animal and tend to move downwardly toward the loin and ribs. The price for boston butts, for example, is 37 ¢ per pound whereas that for pork loin is 55 ¢ per pound, for illustrative purposes. In the inverted or forequarters-down position, the loins also tend to drift toward the hams at the rear quarter, which is not desirable. However, this can be easily overcome during subsequent butchering by making the cut between the loins and hams along a line closer to the hindquarters than otherwise used. The position of this cut near the aitch bone can vary up to 4 inches and still be considered within good butchering practice. Hence, the cut can be made closer to the hindquarters to retain normal distribution of the meat between the loins and hams.

Figure 2:
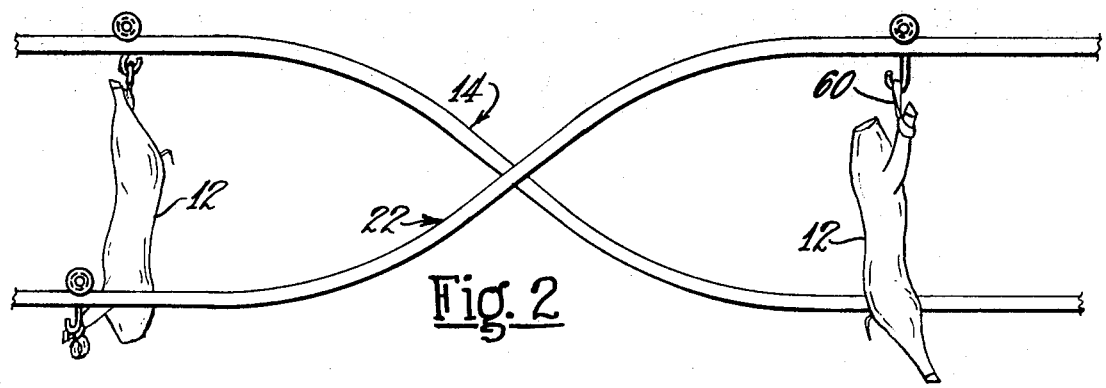
FIG. 2 is a somewhat schematic side view in elevation of the apparatus of FIG. 1 but showing two carcasses before and after inversion.

Referring now particularly to FIGS. 1 and 2, carcasses, or more specifically carcass halves, 10 and 12, are shown being moved along an overhead rail conveyor indicated at 14. At this point, the animal has been stunned, stuck, and bled and the carcass has been de-headed, eviscerated, and split into halves. In the event the animal carcass has not been split completely, so that it still remains connected to one or two points, it is further severed into two separate parts when reaching the left-hand position on the conveyor 14, as shown in FIG. 1. The carcass is now ready under the usual slaughtering processes to be moved to a cooler and chilled. Usually, before the carcass is chilled throughout, rigor mortis has set in but, in any event, by the time the animal carcass is chilled, the meat has set or become rigid and no longer able to slump or drift.

In accordance with the invention, preferably after the animal carcass has been processed, including being eviscerated, it is turned end-for-end while the meat is still flaccid to enable the meat to settle or drift toward the hindquarters. To accomplish this with the conveyor arrangement of FIGS. 1 and 2, the conveyor 14 has a first, upper portion 16, an intermediate slanted portion 18, and a second, lower portion 20. On each side of the conveyor 14, two additional rail-type conveyors 22 and 24 are employed. These are spaced from the conveyor 14 by a distance sufficient to accommodate the carcasses 10 and 12. The conveyor 22 has a first, lower portion 26, an intermediate slanted portion 28, and a second, upper portion 30. The conveyor 24 similarly has a first, lower portion 32, an intermediate slanted portion 34, and a second, upper portion 36. Hangers generally indicated at 38 are carried along the rail conveyors 14, 22, and 24 with the hangers 38 on the rail conveyors 22 and 24 moving at a faster rate than those on the rail conveyor 14.

When the carcasses 10 and 12 are in the approximate left-hand positions shown in FIG. 1, the lower portions are connected with the lower hangers 38 on the lower portions 26 and 32 of the rail conveyors 22 and 24. Since the lower hangers move at a more rapid rate, they move the forequarters of the carcasses 10 and 12 forwardly toward the right so that the carcasses are moved in a counterclockwise direction, as shown in FIGS. 1 and 2. As the hangers 38 approach the upper ends of the slanted portions 28 and 34 of the rail conveyors 22 and 24, the hindquarters of the carcasses 10 and 12 move below the forequarters and as the carcasses move further toward the inverted position, the gam cords of the hind legs can be severed to release the hindquarters from a gambrel 40 which supports the carcasses from the hanger 38 on the rail conveyor 14. The carcasses 10 and 12 then assume the inverted position shown at the right-hand side of FIG. 1. The hangers 38 on the upper portions 30 and 36 of the rails 22 and 24 then continue to move the carcasses 10 and 12 in predetermined paths toward the cooler or other desired destination.

Figure 3:
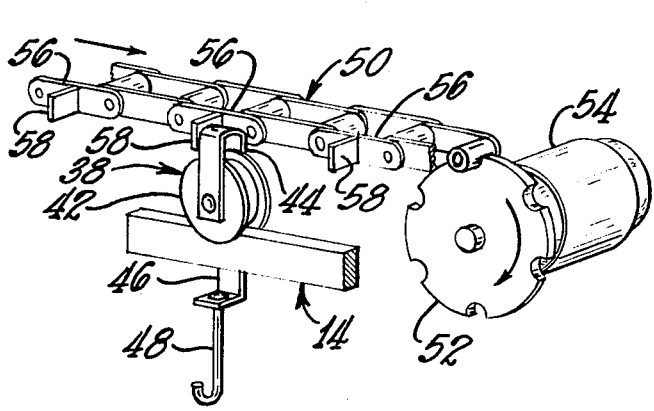
FIG. 3 is a fragmentary view in perspective showing details of the conveying means of FIGS. 1 and 2.

While many types of hangers can be used with the rail conveyors, one suitable design is shown in FIG. 3. The hanger 38 includes a roller 42 which rides on the rail conveyor 14, 22, or 24, the rail conveyor 14 being shown. A U-shaped strap 44 extends above the roller 42 and has a leg 46 depending below the rail conveyor where it pivotally receives a hook 48. The hook 48 can engage the gambrel 40 directly or, where the carcasses or carcass halves are handled singularly, the hook can be inserted directly between the rear leg and gam cord of the carcass. The hanger 38 is moved along the rail by suitable means such as a roller chain 50 driven by a sprocket 52 and a motor 54. Links 56 of the roller chain have dogs or tabs 58 extending outwardly therefrom into the path of the U-shaped straps 44. The tabs 58 thereby engage the U-shaped straps 44 and push the hangers 38 along the rail conveyor. The roller chains 50 are not shown in FIGS. 1 and 2 for clarity of illustration.

In order to connect the forequarters of the carcasses 10 and 12 with the hangers 38 on the lower portions 26 and 32 of the rail conveyors 22 and 24, straps or cords 60 can be tied or looped around forelegs of the carcasses and engaged with the hooks 48 of the hangers. The cords 60 preferably are of nylon and do not deface or damage the forelegs of the carcasses. Since the lengths of the carcasses vary, the operators can adjust the loops and placement of the cords 60 on the forelegs to accommodate these differences in length. Further, the hangers 38 are free to move back and forth relative to the roller chain 50 a distance equal to the spacing between the two adjacent tabs 58 so that the hangers 38 on the rail conveyor 14 and the rail conveyor 22, for example, carrying the carcass 12, can move toward and away from one another by a distance equal to twice the spacing between the two adjacent tabs 58. This enables the apparatus to further accommodate differences in the carcass lengths as the animal carcass is moved along the conveyors and is swung toward the inverted position.

At the end of the rail conveyor 14, and after processing is completed, the hangers 38 can be collected in a container in which they are carried back to the beginning of the processing line and individually mounted on the rail conveyor 14 as needed to carry another carcass. Thus, the hangers 38 on the rail conveyor 14 may be sporadically spaced, according to production needs. On the other hand, the hangers 38 on the conveyor rail 22 and 24 preferably are spaced at relatively close, equal distances so as to be in position when needed to engage the cords 60 on the forelegs of the carcasses 10 and 12.

Figure 4:
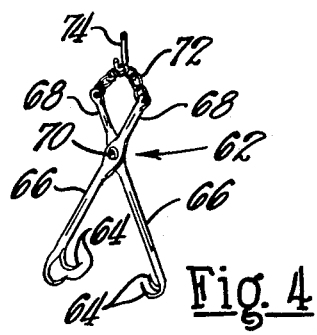
FIG. 4 is a side view of a tong device for holding the animal carcass in the inverted position.

As an alternate to using the nylon cord 60 to connect the lower hangers 38 with the forelegs, a tong member 62 of FIG. 4 can be employed. This has prongs 64 extending from legs 66 which engage the jowl portion of the carcass rather than the foreleg. Leg extensions 68 beyond a pivot 70 are connected by a chain 72 which is engaged by a hook 74 of the hanger 38 or other suitable hanger member. The tong members 62 can be engaged with the jowls in varying positions to compensate for varying lengths of the carcasses.

Modified apparatus for inverting an animal carcass is shown in FIG. 5. This apparatus is designed for lower production processing lines than the apparatus of FIGS. 1 and 2. In this instance, a single overhead rail conveyor 76 is employed. The conveyor 76 has an upper portion 78, an intermediate downwardly slanted portion 80, a lower portion 82, an upwardly slanted portion 84, and a second upper portion 86. The hangers 38 or other hangers can be employed with the rail conveyor 76 and can be moved therealong by the roller chain 50 of FIG. 3 or other suitable drive means.

When a carcass 88, whether it is whole or a half, is moved down the slanted portion 80 of the rail conveyor 76, the carcass is deposited on a surface 90 of a turntable 92. The carcass is placed with the forequarters near the periphery and the hindquarters near the center as the hangers 28 move from left to right in FIG. 5. When the carcass 88 is substantially completely supported on the surface 90, the gam cord can be severed to release the hook 48 from the carcass or the hook 48 can simply be withdrawn from between the hind leg and gam cord. When the hanger and the carcass are separated, the turntable is moved by the operator or a motor drive, if desired, 180° to the right-hand position shown in FIG. 5. During this time, the hanger 38 also has traveled from the left-hand position to approximately the right-hand position as shown in FIG. 5. Also during this time, the operator can attach the strap or cord 60 to the foreleg of the carcass 88. In the second position, then, the strap 60 can be engaged by the hook 48 and as the hanger 38 is carried up the upwardly slanted portion 84 of the rail conveyor 76, the carcass is raised and pulled off the turntable 92. The carcass then continues in a predetermined path along the upper portion 96 of the rail conveyor 76 toward the cooler.

While the carcasses are subjected to the force of gravity when hanging with the hindquarters downwardly, the movement of the meat toward the hindquarters can be increased by increasing the force applied longitudinally of the carcass toward the hindquarters. This force can be in the nature of short repetitive forces applied to the carcass or in the nature of a continuous force applied thereto, in each case the force being directed longitudinally of the carcass and toward the hindquarters thereof.

Means for applying repetitive forces to the carcass is shown in FIG. 6. Here, a modified rail conveyor 96 has an upper edge consisting of a plurality of slanted portions 98 with offsets 100. The rail 96 can be located between the position at which the animal carcasses are inverted and the cooler. The hangers 38 or other suitable hangers carrying the carcasses (not shown in FIG. 6) are moved along the slanted portions 98 and then drop suddenly and sharply off the offsets 100 onto the lower portion of the next slanted portion 98. This causes a jarring force to be applied through the hanger hook to the carcasses. The strength of this force can be changed by changing the height of the offsets 100. A higher offset might be desired, for example, for lighter weight carcasses, such as sheep, than for larger heavier carcasses, such as cattle. The hangers 38 again are moved along the conveyor rail 96 by the roller chain 50 or other suitable drive means.

Since the carcasses hang in the cooler for a period of time during chilling, the short repetitive forces can also be applied while the carcasses are stationary in the cooler. Referring to FIG. 7, the hangers 38 and the carcasses, when reaching the cooler, are pushed by operators onto branch rails 102. In this instance, the branch rails 102 rest on suitable supports 104. The rails 102 have upwardly extending straps 106 carrying cam followers 108 which are engaged by rotatable cams 110 having offsets 112. When the cams 110 are rotated counterclockwise, the rail 102 is slowly raised until the cam followers 108 reach the offsets 112. The rail 102 then drops on the supports 104 and applies a sharp jarring force to the carcasses hanging therefrom. The cams can be rotated several times and then stopped, it not being necessary to continue this jarring force until the meat sets. However, the force can be continually applied as long as desirable, particularly if further settling of the meat continues.

One apparatus for applying a continuous longitudinal force to the carcasses is shown in FIG. 8. In this instance, a truncated conical surface 114 is formed on a rotatable member 116 which is rotated through a shaft 118 and a motor 120, shown schematically. Carcasses 122 are hung by the straps 60, or other suitable means, and by hooks 124 on a supporting ring 126 at the upper end of the rotatable member 116. When the member 116 is rotated, the carcasses 122 swing outwardly from the surface 114 to prevent the carcasses and meat from being deformed as might otherwise occur if the carcasses rested directly on the surface 114. When the member is rotated, the centrifugal forces applied longitudinally of the carcasses toward the hindquarters thereof tends to increase the settlement or drifting of the meat toward the hindquarters. If the rotation is fast enough and if the centrifugal force is firm enough, the meat may be permanently moved toward the hindquarters. At this time, carcasses can then be placed in the cooler, hanging hindquarters downwardly until the meat sets. If the centrifugal force is not strong enough to permanently displace the meat toward the hindquarters, then the rotation of the member 116 and the centrifugal force applied to the carcasses can be continued until the meat sets, either by rigor mortis, or by chilling, if the rotation is undertaken in the cooler.

Various modifications of the above described embodiments of the invention will be apparent to those skilled in the art and it is to be understood that such modifications can be made without departing from the scope of the invention, if they are within the spirit and the tenor of the accompanying claims.

I claim:

1. A method of slaughtering an animal comprising connecting at least one hind leg of the animal to an overhead support to enable the animal to hang from the support with the hindquarters up, cutting a blood vessel in the neck portion of the animal, bleeding the animal while in the same hanging position, subsequently turning the animal carcass end-for-end with the hindquarters hanging downwardly, and supporting the latter carcass in the latte position for a time sufficient to enable the meat to set.

2. The method of slaughtering an animal according to claim 1 characterized further by splitting the carcass longitudinally in half prior to inverting the carcass and hanging the hindquarters downwardly.

3. The method according to claim 1 characterized further by subjecting the animal carcass to a continuous force in a direction generally parallel to the longitudinal extent of the carcass and toward the hindquarters thereof prior to the setting of the meat.

4. The method according to claim 3 characterized further by establishing the continuous force by rotating the animal carcass in a circular path in a plane parallel to the longitudinal extent of the carcass and about an axis perpendicular to the longitudinal extent of the carcass and closer to the forequarters of the animal than the hindquarters, prior to the setting of the meat.

5. The method according to claim 1 characterized further by subjecting the animal carcass to repetitive forces while hanging with the hind feet downwardly and prior to the setting of the meat.

6. The method according to claim 5 characterized further by establishing the repetitive forces to the animal carcass by applying the forces to a support from which the carcass hangs.

7. In a method of slaughtering an animal comprising connecting one hind leg of the animal to an overhead support with the hindquarters up, cutting a blood vessel in the neck portion of the animal, bleeding the animal while in the same hanging position, de-heading and eviscerating the animal carcass, and chilling the animal carcass, the improvement comprising turning the animal carcass end-for-end with the hindquarters hanging downwardly after eviscerating the carcass and prior to chilling the carcass and maintaining the latter position of the carcass at least until the meat sets.

8. The method according to claim 7 characterized further by subjecting the animal carcass to a force in a direction longitudinally of the carcass and toward the hindquarters thereof while hanging in the latter position.

* * * * *